United States Patent [19]

Häfner

[11] Patent Number: 4,661,024

[45] Date of Patent: Apr. 28, 1987

[54] METHOD AND APPARATUS FOR CONTINUOUS GRAVIMETRIC METERING AND FEEDING OF POURABLE MATERIAL

[75] Inventor: Hans W. Häfner, Aichach-Walchshofen, Fed. Rep. of Germany

[73] Assignee: Pfister GmbH, Fed. Rep. of Germany

[21] Appl. No.: 738,312

[22] Filed: May 28, 1985

[51] Int. Cl.[4] .............................................. B65G 53/46
[52] U.S. Cl. ...................................... 406/63; 222/148; 222/216; 406/66
[58] Field of Search ................................... 406/62–68; 222/148, 216, 636

[56] References Cited

U.S. PATENT DOCUMENTS

| 3,178,236 | 4/1965 | Mitchell | 406/67 |
| 3,273,758 | 9/1966 | Starrett | 406/64 X |
| 3,318,641 | 5/1967 | Mommsen | 406/63 |
| 3,909,068 | 9/1975 | Coucher | 406/63 |
| 4,015,754 | 4/1977 | Leurs et al. | 406/67 |
| 4,376,600 | 3/1983 | Egli | 406/64 X |
| 4,528,848 | 7/1985 | Hafner | 222/636 X |

FOREIGN PATENT DOCUMENTS

| 3217406 | 11/1983 | Fed. Rep. of Germany . |
| 798001 | 1/1981 | U.S.S.R. ......................... 406/65 |

*Primary Examiner*—Jeffrey V. Nase
*Attorney, Agent, or Firm*—Armstrong, Nikaido, Marmelstein & Kubovcik

[57] ABSTRACT

A method for operating an apparatus for continuous gravimetric metering and feeding of pourable material conveyed by a conveyer through a metering path, the conveyer including a rotor provided with conveyer pockets, having an essentially vertical axis and being arranged within a housing in a tightly sealed manner, the housing being provided with a charging station and a discharging station the latter including ports for connecting a pneumatic feeding system, wherein a gas is supplied to spaces within the housing and the rotor outside the metering path.

19 Claims, 6 Drawing Figures

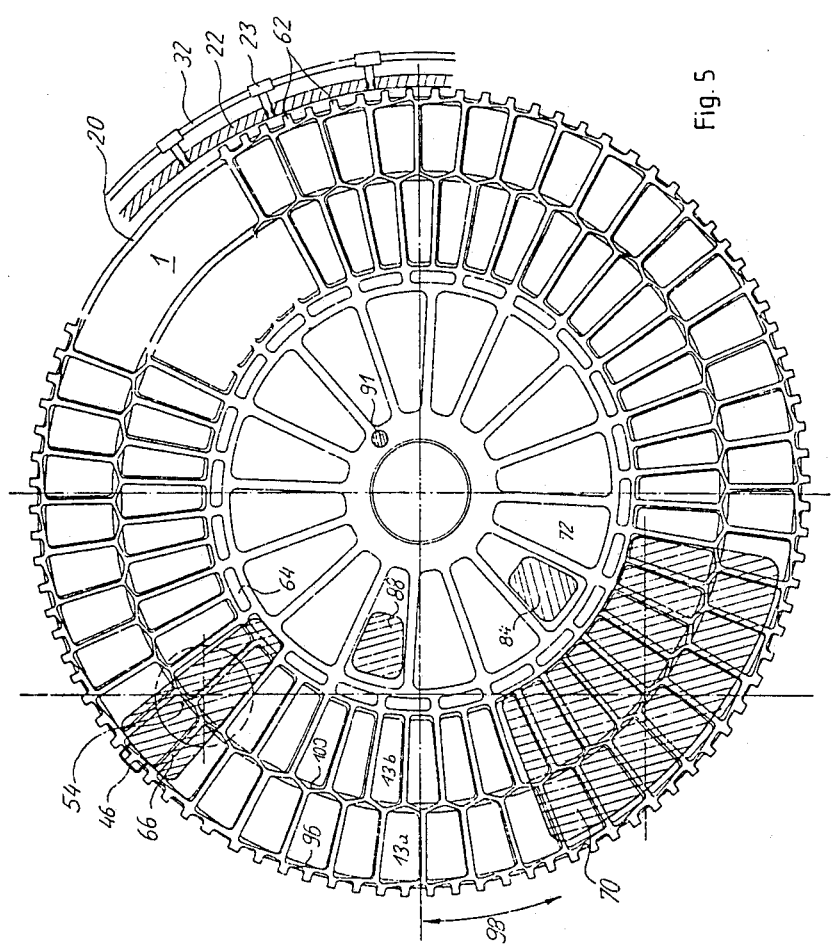

METHOD AND APPARATUS FOR CONTINUOUS GRAVIMETRIC METERING AND FEEDING OF POURABLE MATERIAL

FIELD OF THE INVENTION

The invention relates to a method and apparatus for continuous gravimetric metering and feeding of pourable material, in particular an apparatus operating as a loop conveyer.

BACKGROUND OF THE INVENTION

U.S. Pat. No. 4,528,848 discloses an apparatus of such a type of a loop conveyor, comprising a housing including a side wall having an essentially cylindrical inner surface, an upper and a lower face wall provided with charging and discharging ports respectively and a rotor mounted in and sealed to the housing for rotation about a vertical axis. The rotor is provided with a plurality of laterally closed pockets and has a peripheral cylindrical surface forming an annular interspace with the inner cylindrical surface of the side wall of the housing. Pourable material filled into the rotor through the charging port is conveyed through a measuring path and then discharging through the discharge port. With the known apparatus, the lower and upper face walls of the housing are in engagement with the upper and lower faces of the rotor which results in a noticeable friction between the engaging parts. Also, despite the seals provided, some of very fine particles of the pourable material, for instance coal dust, may penetrate out of the pockets into the interior of the rotor or into the interspace between the inner cylindrical surface of the housing and the peripheral cylindrical surface of the rotor as well as in free spaces in the central portion of the rotor and its bearing system.

SUMMARY OF THE INVENTION

In consideration of the above it is an object of the invention to provide an apparatus as set forth above having an improved long time accuracy of measurement.

It is another object of the present invention to provide an apparatus as set forth above having a longer lifetime of operation.

It is a further object of the invention to provide an apparatus as set forth above having reduced power consumption.

These and other objects are achieved by a method and an apparatus as set forth above where the spaces between the housing and the rotor and/or in the rotor are adapted to be connected to a source of a pressurized gaseous medium, preferably air.

Since the spaces in the housing and the rotor are under continuous pressure of the gaseous medium any entering of powdered material out of the rotor pockets is prevented.

Preferably, as a source of pressurized gaseous medium a branching off from the pneumatic feeding system of the apparatus is used.

The transitions between the fixed and moveable elements of the apparatus are designed such that any anchoring of material particles in the spaces of the housing and the rotor are minimized.

A particular intensive cleaning of the interspace is achieved by providing one or several discharging ports leading into the pneumatic feeding system.

BRIEF DESCRIPTION OF THE DRAWINGS

FIG. 5 is a top view onto a section of the rotor of the apparatus according to the invention.

DESCRIPTION OF THE PREFERRED EMBODIMENT

Figure 4B:
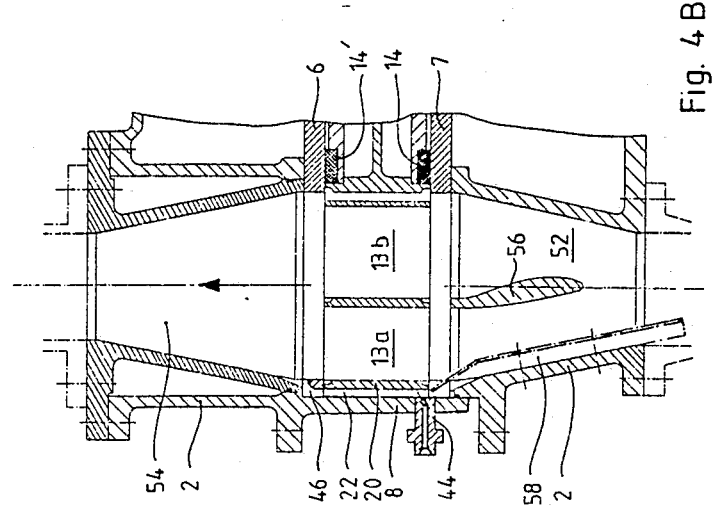
FIGS. 4 A and B are cross-sectional side views through the charging and discharging section respectively and showing a feeding pocket of the rotor as well as the inlet and out-let ports of the pneumatic feeding system.

The Figures show an embodiment of the apparatus 15 according to the invention having a housing 2 enclosing a tightly sealed rotor 1. The rotor 1 is mounted rotatable and drivable by a rotating shaft 3. As a drive a motor/gearing unit 4 is used which is connected to the housing 2 by torque support members 5. The rotor 1 rotates between two sealing plates 6 and 7 engaging upper and lower faces of rotor 1. The sealing plates 6 and 7 are in engagement with an annular member 8 (FIG. 4B). The rotor 1 is provided with a peripheral cylindrical wall 20 (FIG. 5) as well as two groups of feeding pockets 13a, 13b arranged in two concentric rings and offset against each other, as indicated in FIG. 5 which ensures a more uniform emptying of the pockets 13a, 13b. Annular seals 14, 14' (FIG. 4B) provide a relatively tight sealing of the feeding pockets against the inner part of the rotor 1. The housing 2 is mounted pivotally about an axis II—II at joints 16, 16' of a support 50 and is connected at its left part (FIG. 2) to a force measuring device 17.

Figure 1:
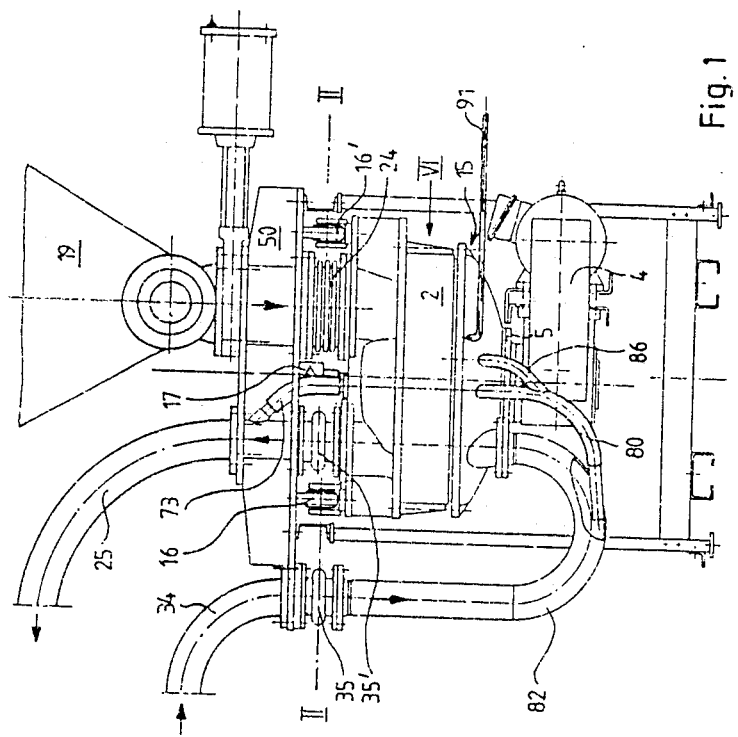
FIG. 1 is a principle side view of one embodiment of the apparatus according to the invention.
Figure 2:
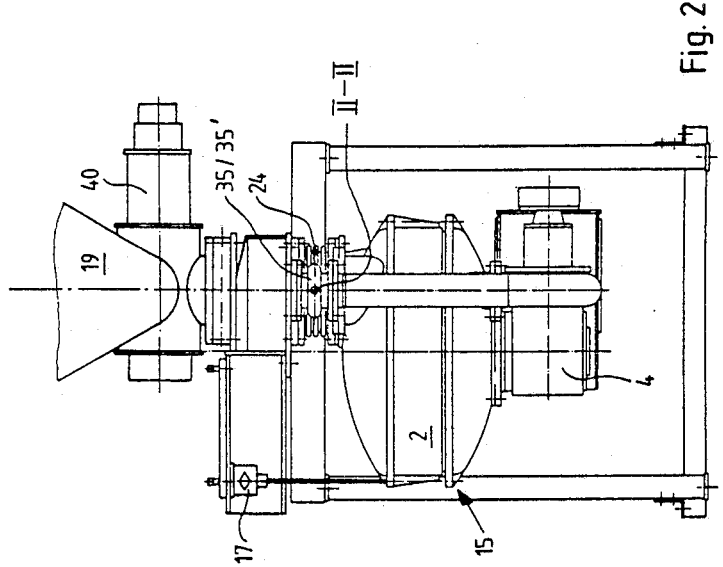
FIG. 2 shows the apparatus according to FIG. 1 in direction of the arrow VI in FIG. 1.

The material to be fed through the apparatus and metered therein is stored in a bin 19 arranged above the housing 2 and is fed to the charging port of the rotor 1 via a wheel gate 40 or preferably directly, and through the elastic coupling 24 (FIGS. 1,2).

The discharging of the feeding pockets filled at the charging port is accomplished at the discharging station shown in FIG. 4B by blowing out of the feeding pockets 13a and 13b. For this purpose at the support 15a compressed air line 34 is secured by means of an elastic coupling 35 which line is connected to the lower port 52 of the housing 2. The material blown out of the feeding pockets 13a, 13b is conveyed from an upper port 54 into a pneumatic conveying line 25 (FIG. 1) which is connected to the upper port 54 via an elastic coupling 35'. As may be seen from FIGS. 1 and 2 all the elastic couplings 24, 35, 35' and the joints 16 and 16' are intersected by the pivotal axis II—II. It should be mentioned that the direction of the air stream may be reversed.

In operation the housing 2 pivots slightly about axis II—II dependent on the quantity of material to be metered and filled into the feeding pockets 13a, 13b and loads the force measuring device 17 with a corresponding torque.

As explained before, there is an annular interspace 22 between the inner cylindrical surface of the wall 8 of the housing 2 and the peripheral wall 20 of the rotor 1. Although the upper and lower faces of the wall 20 engage the sealing plates 6 and 7, in the long run some powdered material will penetrate from the feeding pockets 13 into the interspace 22. This may in particular happen upon the generation of a sudden high pressure as caused by an explosion. The material deposited in the interspace 22 causes an increased friction resulting in an increased wear and requiring a higher torque for rotating rotor 1. Furthermore the reproducibility of the metering and the constancy of the zero value of the apparatus may be lost.

Figure 3:
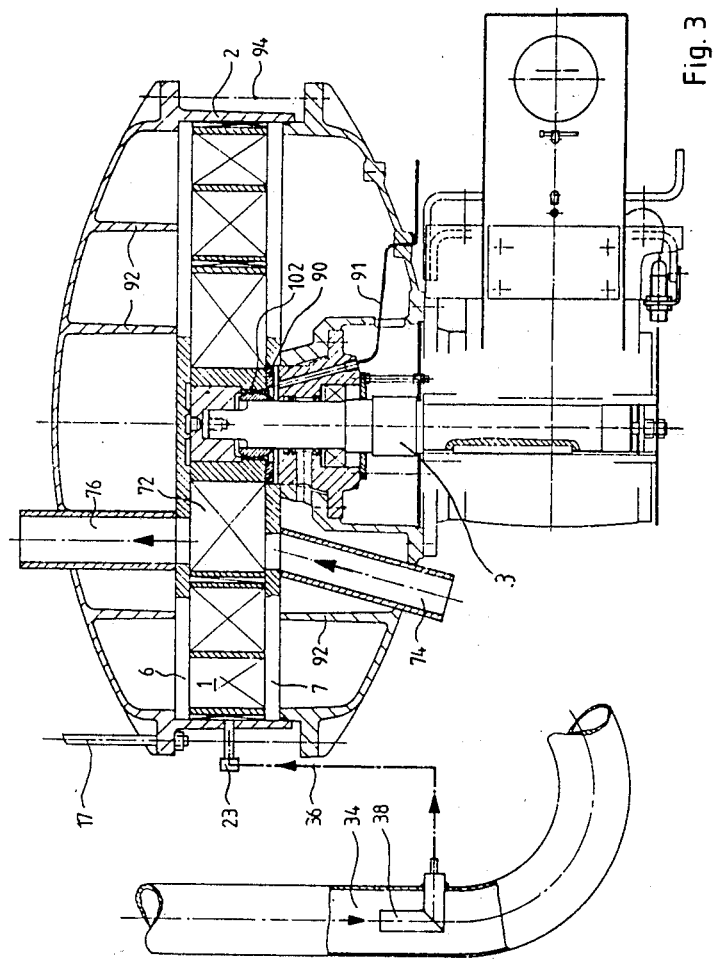
FIG. 3 shows an embodiment of the apparatus according to the invention similar to that according to FIGS. 1 and 2 partly in section and explaining the features of the invention.

According to the present invention a continuous air blocking is provided within the interspace 22. As in particular shown in FIGS. 3 and 5 the cylindrical wall 8 of the housing 2 is provided with at least one nozzle 23 connected to an appropriate source of pressurized air. Though for this purpose a source independent from the metering apparatus may be used, it is preferable to provide a tap tube 38 within the compressed air line 34 the tube 38 being connected to the nozzle 23 via a line 36 (FIG. 3).

Several nozzles 23 may be provided along the periphery of the cylindrical wall 8 of the housing 2 which may be connected via a common ring line 32 to the line 36 (FIG. 5). An appropriate pressure controlling device may be inserted into line 36. With a first embodiment close to the ports 52 and 54, no nozzles 23 are provided.

Additionally or alternatively at least one nozzle 44 (FIG. 4B) may be provided close to the ports 52 and 54 next to the lower sealing plate 7 in the cylindrical wall 8 of the housing 2. Essentially above each nozzle 44 a channel 46 is provided between the sealing plate 6 and the cylindrical wall 8 which channel ends inside the upper port 54. Such nozzles 44 may be connected to any desired source of compressed air in order to be exposed to a sudden high pressure which forcibly blows out the material from the interspace 22 into the port 54 of the compressed air line 34.

The channel 46 may be designed blockable in order to have the interspace 22 filled with compressed blocking air under normal conditions. Instead of separate nozzles 44 the nozzles 23 could be used for the blowing out, as explained above. The nozzles 44 may be connected to any desired source of pressurized air, preferably via a pressure control device.

Instead of providing the nozzle 44 at the outside of a housing 2 preferably a tap tube 58 may be inserted within the blowing line for increasing the speed of the air. The tap tube 58 is indicated in FIG. 4B by a dotdash line. It ends at the lower portion of the interspace 22. As may be seen from FIG. 5 the upper opening of pot 52 and the lower opening of the port 54 as well as the openings in the plates 6,7 may be dimensioned such that the other radial chamber formed by interspace 22 as well as the chambers 64 located radially inwards of the conveying pockets 13a, 13b are open for being blown out by the air stream at the discharging station. The maximum opening is represented by the hatched region 66 in FIG. 5.

Important for the invention is a stream splitter 56 (FIG. 4B) which provides a smooth splitting of the air stream into the outer and inner conveying pockets 13a, 13b. This avoids whirling or formation of eddys which may affect the measuring results.

Figure 4A:
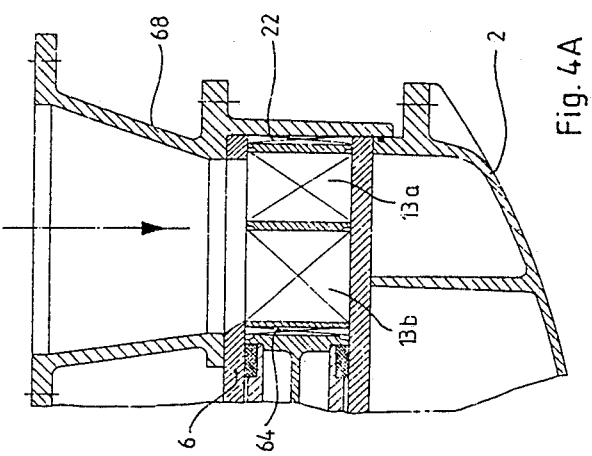

FIG. 4A shows a further means to prevent penetration of material particles into the interspace 22 and the chambers 64, respectively. The lower opening of the charging input port 68 is aligned with an opening in the upper sealing plate 6 which opening is radially narrower than the openings of the conveyor pockets 13a, 13b. In FIG. 5 the effective cross section of the opening is shown by area 70 in hatched lines. Penetration of material particles from the feeding part into spaces of the housing and/or the rotor is effectively reduced by this measure, since sealing plate 6 covers the outer radial chamber, i.e. interspace 22, and the inner chambers 64.

It has been noticed after a long time of operation or upon occurence of pressure bursts even the central portions 72 (FIG. 3 and 5) may be filled with material particles. In FIG. 3 a further means is shown to avoid or reduce such as effect. Via the lower sealing plate 7 a mouthpiece 74 is provided in a position which is opposite the central radial portions 72. An exhaustion mouthpiece 76 originates at the upper sealing plate 6 and leads through the upper wall of the housing 2. As shown in FIG. 1 the exhaustion mouthpiece 76 preferably may be connected to the discharging line 25 of the pneumatic feeding system. The airstream introduced via mouthpiece 74 may again be tapped from blowing line 34; as a modification of the arrangement according to FIG. 3 a tap tube 80 may be attached to the lower point of the arcuate portion 82 (FIG. 1) of the blowing line laterally at an acute angle. The tap tube 80 is connected to the input of the mouthpiece 74. In FIGS. 5 hatched area 84 indicates the exit opening of the mouthpiece 74. It should be noted that the exhaustion mouthpiece 76 is connected with the output line 25 by a hose compensator 73 (FIG. 1) in order to achieve a similar effect as the compensators 24, 35, 35'.

A further means to prevent penetrating of material particles into the central portions of the rotor is the provision of a further pressure line 86, preferably taped from the main air stream, adjacent to the discharging station such that an increased pressure is provided in central portions of the rotor passing the charging station. The opening of the pressure tube 86 ending in the region of the inner portions of the rotor 1 as indicated in FIG. 5 as hatched area 88.

As may be particularly gathered from FIG. 3, rotor 1 rotates in engagement with a fixed ring 90. Since in particular this region is sensitive to friction, penetration of material particles may be prevented by establishing an increased pressure in the bearing area by a pressure line 91 which again is tapped from the main air stream or preferably connected to a conventional air pressure line.

According to the invention further means may be provided in order to reduce wear and depositing of material particles in the spaces in the housing and/or the rotor.

The sealing of rotor 1 in respect to the housing 2 is in particular accomplished by exactly adjusting the space between the sealing plates 6 and 7 in which the rotor 1 rotates (see FIG. 3). However, proper sealing is ensured only then when the sealing plates are exactly planar. Therefore, the invention provides a dome-like shape of the cover portion and the bottom portion of housing 2 spacers being provided between the inner surface of the cover and the bottom portions and the sealing plates 6,7, the spacers being perpendicular to the sealing plates. Space adjustment between the sealing plates 6 and 7 is accomplished by a plurality of screw spindles or fixing means distributed around the periphery of the housing and indicated at reference numeral 94.

FIG. 5 clearly shows the specific design of the walls of the outer and inner conveyor pockets 13a, 13b. In particular, the outer edges 96 of the outer conveyor pockets are not tangentially to the peripher of rotor 1, but slightly directed outwards. This ensures that material particles are removed from the face surfaces of rotor 1 due to centrifugal force in the outer conveyor pockets. Furthermore, the edges 100 between the outer and inner conveyor pockets 13a, 13b are formed as isosceles triangles with obtuse angle of vertex. Thus, material particles are removed from the faces partly into the outer and partly into the inner conveyor pockets when rotor 1 is in rotation.

After a long time of operation wear between rotor 1 and the sealing plates 6,7 may cause a tilting of rotor 1 if rigidly journalled. Such an asymetrical position may give rise to increased wear and a deviation of the zero-position. Accorting to the invention, rotor 1 is arranged in a cap type bearing for free adjustment movement of rotor 1.

It should be noted that port element 54 is liable to increased wear in view of the concentrating air pressure stream containing large quantities of material particles. Accordingly, this port 54 is made by hard molding and is arranged for easy exchange.

In particular FIG. 5 shows an important feature of the inventive design of rotor 1. The outer surface of peripheral wall 20 of rotor 1 is provided with radially extending labyrinth sealings formed as flat extensions 62 arranged parallel to the axis of the rotor and subdividing the interspace 22 in the peripheral direction into radial chambers. This measure prevents the concentric deposition of material in the interspace 22 and enables a concentrated blowing out of the chambers by means of compressed air supplied via the nozzles 44.

Wear between rotor 1 and sealing plates 6,7 may be further reduced by applying lubrication with increased pressure via tube 91 into the bearing region of rotor 1 and maintaining this increased pressure. The lubrication may also be applied to engaging regions between rotor 1 and sealing plates 6,7 which results in a hydrostatic bearing by which the rotor is slightly lifted from the sealing plates 6,7. Preferably, the pressure applied to the sealing and bearing region of the rotor is higher than the pressure in the conveyor pockets 13a, 13b. A lubrication supplying means is connected to tube 91.

I claim:

1. An apparatus for continuous gravimetric metering and feeding of pourable material conveyed by a conveyor means through a metering path, said conveyor means comprising:
   a housing means including a side wall having an essentially cylindrical inner surface and an upper and lower face wall provided with charging and discharging ports, respectively;
   a rotor means mounted in said housing means and sealed by upper and lower sealing plates within said housing, said rotor means being rotatable about a vertical axis, said rotor means having a plurality of first and second laterally closed conveying pockets, said first and second conveying pockets arranged in two concentric rings, said first concentric ring of conveying pockets being offset from said second concentric ring of conveying pockets, said conveying pockets being supplied with said pourable material by said charging port;
   a plurality of spaces including at least a first space radially outside said conveying pockets, a second space radially inside said conveying pockets and a third space radially inside both said second space and said conveying pockets, said plurality of spaces being within said housing means and said rotor means and therebetween, wherein dust from said pourable material may settle; and
   means for supplying a pressurized gaseous medium to said plurality of spaces and to said conveying pockets, wherein dust from said pourable material cannot settle into said plurality of spaces and wherein said pourable material is discharged from said conveying pockets.

2. The apparatus of claim 1 wherein there is provided a pneumatic feeding system connected to the discharging port of the housing and adapted for emptying pockets passing said discharging port and said pressurized gaseous medium is air derived from said pneumatic feeding means.

3. The apparatus of claim 1 wherein said spaces are provided with ports for removing supplied gaseous medium.

4. The apparatus of claim 3 wherein said ports for removing said gaseous medium are connected to an output line of said pneumatic feeding systems.

5. The apparatus of claim 3 wherein said ports are connected to an output line of said pneumatic feeding system by a flexible means.

6. Apparatus of claim 1 wherein said first of said spaces is provided between an inner cylindrical surface of of said side wall of said housing and a peripheral cylindrical surface of said rotor.

7. The appartus of claim 6 wherein a periphery of said rotor is provided with elevations subdividing said first space in a plurality of chambers.

8. The apparatus of claim 1 wherein said second of said spaces is provided in the central region of the rotor surrounded by said conveyor pockets.

9. The apparatus of claim 1 wherein said third of said spaces is provided in a bearing region of said rotor.

10. The apparatus of claim 1 wherein said conveying pockets are arranged in two concentric rings said pockets of one ring being offset to said pockets of the other ring.

11. The apparatus of claim 10 wherein walls of said conveying pockets of said inner and outer concentric rings which walls extend in peripheral direction are arranged at an acute angle with the tangential direction.

12. The apparatus of claim 1 wherein said sealing plates are provided at said discharging station with an enlarged opening permitting said pressurized gaseous medium supplied by said pneumatic feeding system to flow both through said conveying pockets and first and second spaces passing said discharging station.

13. The apparatus of claim 1 wherein at an inlet of said discharging station there is provided a stream splitter for distributing pressurized gaseous medium to first and second of said conveying pockets whilst maintaining a smooth flow of pressurized gaseous medium said first of said conveying pockets being arranged in an outer concentric ring and said second of said conveying pockets being arranged in an inner concentric ring of said rotor and being offset to said conveying pockets of said outer ring.

14. The apparatus of claim 1 wherein said sealing plates are supported by spacers engaging inner surfaces of an upper and lower part of said housing.

15. The apparatus of claim 1 wherein said housing comprises an upper and a lower part moveable to each other and the distance between said sealing plates is adjustable by a fixing means arranged peripherally of said housing.

16. The apparatus of claim 1 wherein said upper sealing plate is provided with an opening aligned with an opening in said charging station, said opening aligned with said charging station having a radial dimension smaller than that of said conveying pockets.

17. The apparatus of claim 1 wherein said rotor is supported in a bearing in a cap type enclosure.

18. The apparatus of claim 1 wherein between said rotor and said upper and lower sealing plates a space is provided arranged to be filled with a lubrication means which is under high pressure for establishing a hydrostatic bearing.

19. The apparatus of claim 18 wherein a lubrication means supply device is provided for supplying the lubrication means at a pressure higher than the pressure existing in the conveying pockets in operation.

* * * * *